US012806867B2

(12) United States Patent
Lovejoy et al.

(10) Patent No.: US 12,806,867 B2
(45) Date of Patent: Nov. 24, 2026

(54) COMPOSITE PARTS WITH STITCHING

(71) Applicant: United States of America as represented by the Administrator of NASA, Washington, DC (US)

(72) Inventors: Andrew Elwyn Lovejoy, Hampton, VA (US); Erin K. Anderson, Hampton, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 213 days.

(21) Appl. No.: 18/760,404

(22) Filed: Jul. 1, 2024

(65) Prior Publication Data

US 2025/0282105 A1 Sep. 11, 2025

Related U.S. Application Data

(60) Provisional application No. 63/562,308, filed on Mar. 7, 2024.

(51) Int. Cl.

| | |
|---|---|
| ***B29C 70/22*** | (2006.01) |
| ***B29C 71/00*** | (2006.01) |
| ***D05B 21/00*** | (2006.01) |
| ***D05B 23/00*** | (2006.01) |
| ***D05B 93/00*** | (2006.01) |

(52) U.S. Cl.

CPC .............. *B29C 70/22* (2013.01); *B29C 71/00* (2013.01); *D05B 21/007* (2013.01); *D05B 23/00* (2013.01); *D05B 93/00* (2013.01); *B29C 2793/0045* (2013.01); *B29C 2793/009* (2013.01)

(58) Field of Classification Search

CPC ...... D05B 11/00; D05B 23/00; D05B 21/005; D05B 21/00; B29C 70/543; F16D 65/125; F16D 65/126; D04H 1/52

See application file for complete search history.

(56) References Cited

U.S. PATENT DOCUMENTS

| | | | | |
|---|---|---|---|---|
| 5,429,853 A * | 7/1995 | Darrieux | D04H 1/52 | 428/113 |
| 5,543,005 A * | 8/1996 | Monget | D04H 3/10 | 156/169 |
| 5,546,880 A * | 8/1996 | Ronyak | B32B 18/00 | 112/475.01 |
| 7,503,273 B2 * | 3/2009 | Beneventi | B29B 11/16 | 112/440 |

(Continued)

OTHER PUBLICATIONS

Lovejoy et al., Three-Dimensional Stitch Path, Automation and Production Advances, Society for the Advancement of Material and Process Engineering, vol. 58, No. 4, 2022, pp. 11-26.

*Primary Examiner* — Danny Worrell

(74) *Attorney, Agent, or Firm* — Robin W. Edwards; M. Bruce Harper; Trenton Roche

(57) ABSTRACT

A composite can comprise a fabric having a plurality of stacked fiber layers; a filament stitched though the fabric in a pattern; and a bulk material surrounding the fabric and the filament, wherein the fabric and the bulk material are configured to include an opening through the composite workpiece, the opening having a perimeter, and the pattern has a shape which borders the perimeter and is offset away from the perimeter by less than or equal to about one-half of an inch.

19 Claims, 8 Drawing Sheets

(56) References Cited

U.S. PATENT DOCUMENTS

| | | | | |
|---|---|---|---|---|
| 8,034,273 | B2 * | 10/2011 | Lalande | B29C 70/24 264/255 |
| 9,309,613 | B1 * | 4/2016 | Le Costaouec | D05B 21/005 |
| 10,286,856 | B2 * | 5/2019 | Rijpkema | D05B 17/00 |
| 10,436,267 | B2 * | 10/2019 | Simpson | F16D 65/126 |
| 11,090,880 | B2 * | 8/2021 | Amat | D04C 1/06 |
| 12,435,647 | B1 * | 10/2025 | Xie | F01D 25/24 |
| 2003/0222371 | A1 * | 12/2003 | Edelmann | D04C 1/06 264/103 |
| 2005/0042410 | A1 * | 2/2005 | Sakonjo | B29B 11/16 428/107 |
| 2005/0059309 | A1 * | 3/2005 | Tsotsis | D04H 13/006 442/364 |
| 2009/0098331 | A1 * | 4/2009 | Lalande | B29C 70/545 428/113 |
| 2016/0009051 | A1 * | 1/2016 | Tsotsis | C08J 5/247 156/60 |
| 2016/0332340 | A1 * | 11/2016 | Rijpkema | D05B 17/00 |
| 2020/0108569 | A1 * | 4/2020 | Lanfant | B29C 70/543 |
| 2025/0162277 | A1 * | 5/2025 | Takahashi | B32B 7/12 |
| 2025/0282105 | A1 * | 9/2025 | Lovejoy | D05B 93/00 |

* cited by examiner

COMPOSITE PARTS WITH STITCHING

CROSS-REFERENCE TO RELATED PATENT APPLICATION(S)

This patent application claims the benefit of and priority to U.S. Provisional Application No. 63/562,308, filed on Mar. 7, 2024, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Composite parts can be manufactured from a reinforcing material and a bulk material and beneficial physical properties of each material can be present in the final composite part. For example, in a fiber reinforced polymer the reinforcing material can include a reinforcing fiber preform and the bulk material can include a polymer resin which can be infused into the reinforcing fiber preform. Such a fiber reinforced polymer can have physical properties attributable to the reinforcing material (e.g., tensile and/or shear strength) and physical properties attributable to the bulk material (e.g., durability, toughness, and/or hardness). Additionally, the interaction of the reinforcing material and bulk material can augment physical properties in component of the composite to improve the physical properties of the composite material beyond what either component material offers.

One aspect of such composite parts which can benefit the aerospace industry is in improved strength-to-weight ratio. Composite parts having sufficient strength at a reduced weight can be substituted for metal part to improve the fuel economy of aircraft (e.g., by reducing the weight of the aircraft).

In making composite parts, the reinforcing material can be provided in a preform which can be shaped by various methods before it is infused with the bulk material. During infusion, the preform can be placed into a mold and the bulk material can be drawn into the mold (e.g., under vacuum conditions) so that the bulk material infuses the preform and achieves a prescribed final shape. The preform can be made from multiple layers of a reinforcing fabric which can have space between the fabric fibers and between the layers and can cause the preform to have dimensions which are larger than the same dimensions after infusion and encapsulation. Before infusion, the preform can be referred to as a “dry preform”. In some shaping processes, the preform is stitched with a reinforcing filament (also referred to as “reinforcing thread”). Such stitching can help to maintain the preform shape during infusion and provide desired localized reinforcement through the thickness of the preform after infusion. However, stitching intricate shapes, such as curves having small radii, can require specialized manufacturing equipment.

A sewing machine can be used to sew stitches into a preform before infusion.

However, the sewing machine can have a limitation on the size of material that can be sewn based on a distance between the needle and a back plate, known as the “throat”.

BRIEF SUMMARY OF THE INVENTION

As disclosed herein, a composite can include a fabric having a plurality of stacked fiber layers; a filament stitched though the fabric in a pattern; and a bulk material surrounding the fabric and the filament, wherein the fabric and the bulk material are configured to include an opening through the composite, the opening having a perimeter, and the pattern has a shape which borders the perimeter and is offset away from the perimeter by less than or equal to about one-half of an inch.

In an implementation, the filament can be offset away from the perimeter by less than or equal to about one-quarter of an inch.

In an implementation, the filament can be offset away from the perimeter by less than or equal to about one-eighth of an inch.

In an implementation, the opening can be a circular shape.

In an implementation, the filament can encircle the perimeter of the circular shape and is offset away from the perimeter by less than or equal to about one-quarter inch.

In an implementation, the filament can include a first filament stitched through the fabric in a first pattern and a second filament stitched through the fabric in a second pattern, the first pattern can have a first shape which borders a first portion of the perimeter, and the second pattern has a second shape which borders a second portion of the perimeter, and together the first pattern and the second pattern follow at least about 80% of a length of the perimeter.

In an implementation, the filament can be stitched through the fabric with a chain stitch pattern having a series of interlocking loops of the filament on a bottom surface of the fabric and a corresponding series of stitches on a top surface of the fabric.

As disclosed herein, a method can include: moving at least one of a double-sided stitching apparatus and a fiber composite preform so that, the double-sided stitching apparatus moves relative to a surface of the fiber composite preform sequentially along a plurality of connected path segments; and stitching, with the double-sided stitching apparatus, a filament through a fiber composite preform in a curved shape offset away from a perimeter of an opening to be formed in the fiber composite preform by less than or equal to about one-half of an inch.

In an implementation, the method can further include: vacuum consolidating the fiber composite preform with a bulk material to form a composite part; and removing a portion of the composite part to form the opening.

In an implementation, the removing can include at least one of cutting, drilling, or milling through the composite part.

In an implementation, the opening can form a hole through the composite part.

In an implementation, the method can further include: extending a stud of a two-part fastener through the opening; and coupling, to the stud, a head of the two-part fastener which corresponds to the stud to secure the two-part fastener in the opening.

In an implementation, the stud can include a pin, a lug, or a bolt, and the head can include a pin, a nut, or a ring.

As disclosed herein, an apparatus can include a controller configured to execute a process to: move at least one of a double-sided stitching apparatus having a needle and a fiber composite preform so that, the double-sided stitching apparatus moves relative to a surface of the fiber composite preform sequentially along a plurality of connected path segments; stitch, with the needle, a filament into the fiber composite preform in a stitch pattern as the double-sided stitching apparatus moves sequentially along the plurality of connected path segments relative to the surface to thereby form a stitched fiber composite preform; and move the needle with linear and reciprocating movement relative to the double-sided stitching apparatus so that, when the needle is extended into the fiber composite preform to stitch, the needle is temporarily stationary relative to the double-sided stitching apparatus as the double-sided stitching apparatus moves relative to the fiber composite preform, wherein the stitch pattern includes: a plurality of adjacent points where the filament penetrates through the fiber composite preform, the filament extends along the surface between adjacent points of the plurality of adjacent points, and a shape of the plurality of adjacent points forms a curve, and the double-sided stitching apparatus and the fiber composite preform are not rotated during the process.

In an implementation, two or more connected path segments of the plurality of connected path segments can extend between adjacent points of the plurality of adjacent points.

In an implementation, the needle can extend through the fiber composite preform once for every two path segments of the plurality of connected path segments.

In an implementation, a ratio of a number of path segments of the plurality of connected path segments to a number of adjacent points of the plurality of adjacent points can be 2:1 for at least a portion of the stitch pattern.

In an implementation, apart from a first point of the plurality of adjacent points, adjacent points of the plurality of adjacent points can correspond to two connected path segments of the plurality of connected path segments.

In an implementation, each path segment of the plurality of path segments can be linear.

In an implementation, the controller can be further configured to execute the process to: move the double-sided stitching apparatus sequentially along the plurality of connected path segments; move the needle with the reciprocating movement relative to the double-sided stitching apparatus to retract the needle from the fiber composite preform and move the needle with the linear movement to return the needle to a start position relative to the double-sided stitching apparatus before the needle is extended again from the double-sided stitching apparatus with the reciprocating movement, wherein each path segment of the plurality of path segments is linear.

These and other features, advantages, and objects of the present invention will be further understood and appreciated by those skilled in the art by reference to the following specification, claims, and appended drawings.

DETAILED DESCRIPTION OF THE INVENTION

Figure 1:
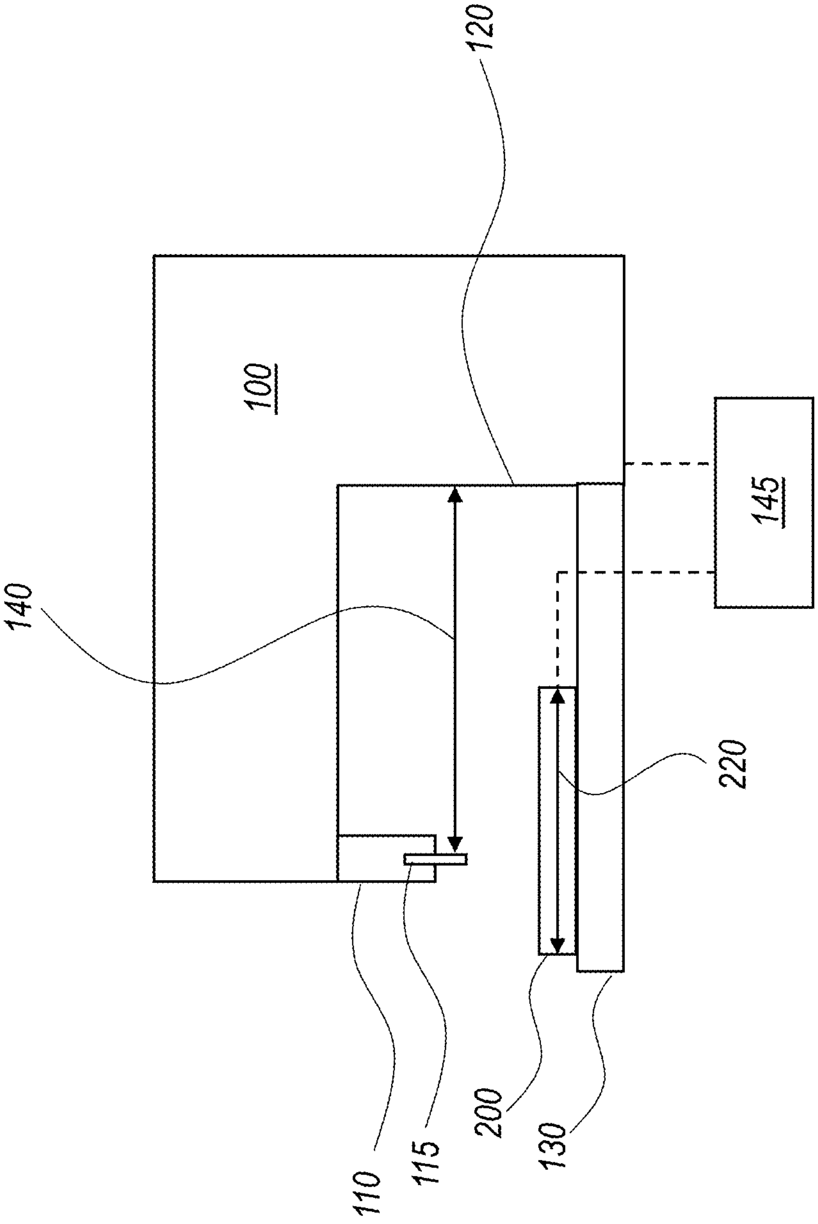
FIG. 1 is a schematic illustration of an apparatus of the disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIG. 1, a sewing machine 100 can include a stitching apparatus 110 (e.g., a double-sided stitching apparatus, tufting apparatus, single-sided stitching apparatus, and the like) a back plate 120 (also referred to as a back plane), and a work surface 130 where a composite workpiece 200 (e.g., a fabric such as a dry fiber preform, textile, or other material to be sewn prior to consolidation with a bulk material) can be placed during sewing of a filament into the composite workpiece 200. The stitching apparatus 110 can refer to the part(s) of the sewing machine 100 which executes the stitching, such as a single needle and looper for a double-sided stitching apparatus or two needles for the single-sided stitching apparatus. For the double-sided stitching apparatus, the composite workpiece 200 can be between the needle 115 and the looper when the needle is retracted. For a chain stitching operation with the double-sided stitching apparatus, when the needle is extended, the needle 115 can penetrate through the composite workpiece 200 with a filament 300 attached thereto, and the looper can receive the filament 300 (e.g., rotate so as to grab the filament 300) and create a loop of filament 300 (e.g., along a bottom surface of the composite workpiece 200) which the needle 115 can be extended through during a subsequent stitch. The process can be repeated for a plurality of stitches to create a plurality of loops.

The stitching apparatus 110 can include a needle 115, and a distance 140 between the needle 115 and the back plate 120 can be referred to as the throat. The distance 140 can limit the size of composite workpiece 200 which can be sewn by the sewing machine 100. For example, a workpiece with a width 220 greater than the distance 140 may be sewn with the sewing machine 100, but without deforming (e.g., wrinkling) the composite workpiece 200 (e.g., as the workpiece impinges on the back plate 120), the distance inward from an edge of the composite workpiece 200 can be limited to the distance 140.

In order to sew a curve into the composite workpiece 200, at least one of the composite workpiece 200 and the sewing machine 100 (e.g., when the stitching apparatus 110 is fixed relative to the sewing machine 100) can be relatively rotated during the sewing process so that the needle 115 changes orientation relative to the composite workpiece 200 and follows the desired curved shape relative to the composite workpiece 200. In this case, as the at least one of the composite workpiece 200 and the sewing machine 100 are rotated an edge of the workpiece can impinge on the back plate 120 (e.g., causing the composite workpiece 200) to deform (e.g., wrinkle). Accordingly, methods and controls are disclosed herein which can facilitate sewing structures without relative rotation between the composite workpiece 200, the sewing machine 100, and/or the stitching apparatus 110. Additionally, the method and controls disclosed herein can facilitate sewing structures without translational movement of the composite workpiece 200 relative to the sewing machine 100 and/or stitching apparatus 110. Therefore, the disclosed methods and controls can improve sewing operations and achieve sewed structures which have not existed previously.

Figure 2:
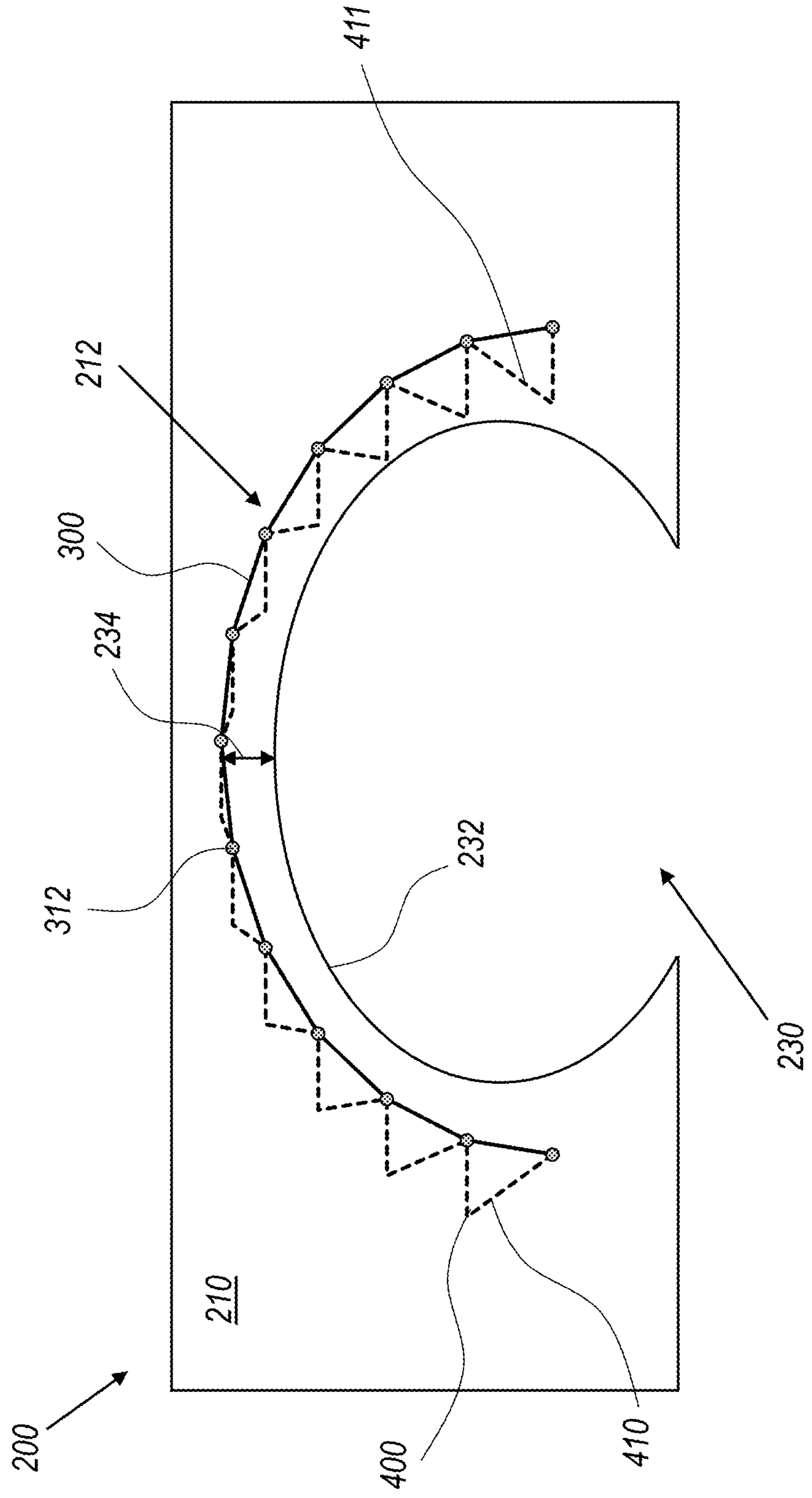
FIG. 2 is a schematic illustration of a workpiece having an opening.

As shown in FIG. 2, a composite workpiece 200 can include a fabric 210 having a plurality of stacked fiber layers, a filament 300 stitched though the fabric 210 in a stitch pattern 212, and a bulk material surrounding the fabric 210 and the filament 300. The fabric 210 and the bulk material can be configured to form an opening 230 through the composite workpiece 200, the opening 230 having a perimeter 232. The pattern stitch 212 can have a shape which borders the perimeter 232 and can be offset by a distance 234 away from the perimeter. The distance 234 between the perimeter 232 and the filament 300 can be less than or equal to about one-half of an inch, or less than or equal to about one-quarter of an inch, or less than or equal to about one-eighth of an inch.

The filament 300 can reinforce the through-thickness strength of the composite workpiece 200 at the perimeter 232 of the opening 230. In this way, when a fastener or other device is extended through the opening of the composite workpiece 200, the plurality of stacked fiber layers can be less likely to delaminate, splay, or incur mechanical damage (e.g., fatigue, shear cracking, and the like) during service. As such, the composite workpiece 200 having an opening 230 therethrough and a filament 300 bordered closely to the perimeter 232 of the opening 230 (e.g., within one-half inch of the perimeter 232) can have improved damage tolerance in comparison to a composite workpiece 200 having an opening 230 without a filament 300 bordering the perimeter 232 of the opening 230. In this way, the fastener extended through the opening 230 (e.g., of a joint assembly) can be encapsulated by the filament 300. For example, with the fastener extended through the opening 300 the filament 300 can surround the fastener and provide reinforcement to the composite where the fastener may interact with the composite.

The filament 300 can further aid by providing damage arrestation (e.g., to prevent growth of cracks) at an opening 230 (e.g., such as a through hole) of the composite workpiece 200. For example, when a fastener is fastened through the opening 230 of the composite workpiece 200, stress caused by vibration and shock loads of the fastener interacting with the opening 230 during service (e.g., such as air travel in the case of an airplane part) can be distributed more evenly around the perimeter of the opening by the filament 300 which provides through-thickness reinforcement to the composite workpiece. Additionally, when material of the composite workpiece 200 is removed to form an opening 230 (e.g., a through hole) in the composite workpiece 200, such as by a drilling, cutting, machining, milling, or like operation, the filament 300 can help to reinforce and hold the stacked fiber layers and prevent delamination of the fibers from the bulk material. As a result, the disclosed structures prevent damage to composite parts during manufacture and service.

The opening 230 can have any shape. For example, the opening 230 can have an oval shape, a circular shape, partial circle shape (e.g., half-circle shape), partial oval shape (e.g., half-oval shape) or a polygonal shape having straight or curved edges. The filament 300 can encircle at least a portion of the perimeter 232 of the opening 230. For example, the filament 300 can encircle one-quarter, one-half, three-quarters, or all of the perimeter 232 of the opening 230. In an implementation, the filament 300 can encircle all of the perimeter 232 of an opening 230 having a circular shape and can be offset away from the perimeter 232 of the opening 230 by less than or equal to about one-half of an inch, or less than or equal to about one-quarter of an inch, or less than or equal to about one-eighth of an inch.

An apparatus of the disclosure can include a controller 145. The controller 145 can include a computing apparatus, such as (in a non-limiting example) any computer or computer processor, that includes processing hardware and/or software implemented on the processing hardware to transmit and receive (communicate (network) with other computing apparatuses), store and retrieve from computer readable storage media, process and/or output data. According to an aspect of an implementation, the described features, functions, operations, processes, methods, steps, and/or benefits can be implemented by and/or use processing hardware and/or software executed by processing hardware. For example, a controller 145, as illustrated in FIG. 1 can include a central processing unit (CPU) or a computing processing system (e.g., one or more processing devices (e.g., chipset(s), including memory, etc.) that can process or execute instructions, namely software, program(s), and/or application(s), which can be stored in a memory and/or a computer readable storage media (e.g., read-only memory (ROM), flash memory, hard disk, solid state memory, and the like), transmission communication interface (e.g., network interface, wire/wireless data network interface), input device (e.g., mouse, keyboard, multi-touch display, audio microphone, sensor, and the like), and/or an output device, for example, a display device (e.g., multi-touch display, audio speaker, visual display, and the like), a printing device, and which can be coupled (directly or indirectly) to each other, for example, can be in communication among each other through one or more data communication buses.

In an implementation, the controller 145 can be configured to control at least one of the sewing machine 100, the stitching apparatus 110 (e.g., a double-sided stitching apparatus) and the composite workpiece 200 (e.g., to control movement of the workpiece 200 relative to the stitching apparatus 110).

In addition, an apparatus can include one or more apparatuses in computer network communication with each other or other apparatuses and the implementations relate to control and/or communication of aspects of the disclosed features, functions, operations, processes, methods, steps, and/or benefits, for example, data or information involving local area network (LAN) and/or Intranet based computing, cloud computing in case of Internet based computing, Internet of Things (IoT) (network of physical objects-computer readable storage media (e.g., databases, knowledge bases), devices (e.g., appliances, cameras, mobile phones), vehicles, buildings, and other items, embedded with electronics, software, sensors that generate, collect, search (query), process, and/or analyze data, with network connectivity to exchange the data), online websites. In addition, a computer processor can refer to one or more computer processors in one or more apparatuses or any combinations of one or more computer processors and/or apparatuses. An aspect of an implementation relates to causing and/or configuring one or more apparatuses and/or computer processors to execute the described operations. The results produced can be output to an output device, for example, displayed on the display or by way of audio/sound. An apparatus or device refers to a physical machine that performs operations by way of electronics, mechanical processes, for example, electromechanical devices, sensors, a computer (physical computing hardware or machinery) that implement or execute instructions, for example, execute instructions by way of software, which is code executed by computing hardware including a programmable chip (e.g., chipset, computer processor, electronic component), and/or implement instructions by way of computing hardware (e.g., in circuitry, electronic components in integrated circuits, and the like)-collectively referred to as hardware processor(s), to achieve the functions or operations being described. The functions of embodiments described can be implemented in a type of apparatus that can execute instructions or code.

More particularly, programming or configuring or causing an apparatus or device, for example, a computer, to execute the described functions of implementation of the disclosure creates a new machine where in case of a computer a general-purpose computer in effect becomes a special purpose computer once it is programmed or configured or caused to perform particular functions of the implementations of the disclosure pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable storage media, e.g., a non-transitory or persistent computer-readable storage medium. Examples of the non-transitory computer-readable media include a magnetic recording apparatus, an optical disk, a magneto-optical disk, and/or volatile and/or non-volatile semiconductor memory (for example, random access memory (RAM), ROM, etc.). Examples of the magnetic recording apparatus include a hard disk device (HDD), a flexible disk (FD), and a magnetic tape (MT). Examples of the optical disk include a DVD (Digital Versatile Disc), DVD-Read-only memory (DVD-ROM), DVD-Random Access Memory (DVD-RAM), BD (Blue-ray Disk), a Compact Disc (CD)-Read Only Memory (CD-ROM), a CD-Recordable (CD-R) and/or CD-Rewritable (CD-RW). The program/software implementing the embodiments may be transmitted over a transmission communication path, e.g., a wire and/or a wireless network implemented via hardware. An example of communication media via which the program/software may be sent includes, for example, a carrier-wave signal.

An apparatus of the disclosure can include a controller 145 configured to execute a process (e.g., a sewing process) to move at least one of a double-sided stitching apparatus 110 having a needle 115 and a composite workpiece 200 (e.g., a fiber composite preform) so that, the double-sided stitching apparatus 110 moves relative to a surface of the composite workpiece 200 (e.g., the fiber composite preform) sequentially along a plurality of connected path segments 400 (e.g., shown in dotted lines in the attached Figures).

The controller 145 can be configured to execute the process to stitch, with the needle 115, a filament 300 into the workpiece (e.g., the fiber composite preform) in a stitch pattern 212 as the double-sided stitching apparatus moves sequentially along the plurality of connected path segments 400 relative to the surface to thereby form a stitched workpiece (e.g., a stitched fiber composite preform). The controller 145 can be configured to communicate with at least one of the sewing machine 100 and the work surface 130 (e.g., so as to be able to move a composite workpiece 200 coupled thereto).

The controller 145 can be configured to execute the process to move the needle 115 with linear and reciprocating movement relative to the double-sided stitching apparatus 110 so that, when the needle is extended into the composite workpiece 200 (e.g., the fiber composite preform) to stitch, the needle 115 is temporarily stationary relative to the double-sided stitching apparatus 110 as the double-sided stitching apparatus 110 moves relative to the composite workpiece 200 (e.g., the fiber composite preform). For example, the needle 115 can be moved linearly with countermotion relative to the double-sided stitching apparatus 110 to maintain its position as the double-sided stitching apparatus 110 continues to move.

The stitch pattern 212 can include a plurality of adjacent points where the filament 300 penetrates through the composite workpiece 200 (e.g., through the fiber composite preform). The filament 300 can extend along the surface between adjacent points of the plurality of adjacent points, and a shape of the plurality of adjacent points can form a curve (e.g., an arc of between greater than or equal to about 180° and less than or equal to about) 360°. The double-sided stitching apparatus 110 and the composite workpiece 200 (e.g., the fiber composite preform) can be not rotated during the process. Furthermore, the composite workpiece 200 (e.g., the fiber composite preform) can be not translated during the process. In this way, composite workpiece 200 can be prevented from impinging on the back plate 120 and the curve can be stitched into the workpiece as far as the distance 140 from the back plate 120 will allow. Such method can reduce the throat distance required to complete a stitched curve and/or allow for smaller radius curves to be stitched by an sewing machine 100 relative to a stitching process which relies on relative rotation between the composite workpiece 200 and the double-sided stitching apparatus 110.

The plurality of connected path segments 400 can be configured so that a desired number of stitches (e.g., between adjacent stitch penetration points 314) is achieved. Further, the number of path segments of the plurality of connected path segments 400 can be chosen to minimize the movement of the double-sided stitching apparatus 110 between each point of the plurality of adjacent points where the needle 115 penetrates the composite workpiece 200.

The controller 145 can be configured to execute the process so that two or more connected path segments of the plurality of connected path segments extend between adjacent points of the plurality of adjacent points. The controller 145 can be configured to execute the process so that the needle is extended through the fiber composite preform once for every two path segments of the plurality of connected path segments.

The controller 145 can be configured to execute the process so that a ratio of a number of path segments of the plurality of connected path segments to a number of adjacent points of the plurality of adjacent points is 2:1 for at least a portion of the stitch pattern.

The controller 145 can be configured to execute the process so that, apart from a first point of the plurality of adjacent points, adjacent points of the plurality of adjacent points correspond to two connected path segments of the plurality of connected path segments.

The controller 145 can be configured to execute the process so that each path segment of the plurality of path segments is linear. Alternatively, the controller 145 can be configured to execute the process so that at least one path segment of the plurality of path segments is curved.

As can be seen in FIG. 2, a length and/or a direction of a path segment of the plurality of connected path segments 400 can be different from another path segment of the plurality of connected path segments 400 between stitch penetration points 312. Furthermore, the length and/or direction of a path segment of the plurality of connected path segments 400 can repeat or mirror another path segment of the plurality of connected path segments 400 between the stitch penetration points 312. For example, a length of a first path segment 410 of the plurality of connected path segments 400 can be the same as a length of a second path segment 411 of the plurality of connected path segments 400. A direction of the first path segment 410 of the plurality of connected path segments 400 can mirror a direction of a second path segment 411 of the plurality of connected path segments 400. The plurality of connected path segments 400 can form a zig-zag and/or saw-tooth like shape (e.g., where adjacent path segments of the plurality of connected path segments 400 has a different direction). Path segments of the plurality of connected path segments 400 can have different lengths (e.g., adjacent path segments of the plurality of connected path segments 400 can have different lengths. Both the length and direction of adjacent path segments of the plurality of connected path segments 400 can be different from one another.

The controller 145 can be further configured to execute the process to move the double-sided stitching apparatus 110 sequentially along the plurality of connected path segments 400, move the needle 115 with the reciprocating movement relative to the double-sided stitching apparatus 110 to retract the needle from the composite workpiece 200 (e.g., the fiber composite preform) and move the needle 115 with the linear movement to return the needle 115 to a start position relative to the double-sided stitching apparatus 110 before the needle is extended again from the double-sided stitching apparatus 110 with the reciprocating movement. Each path segment of the plurality of path segments can be linear. In this way, the needle 115 can penetrate the composite workpiece 200 while the double-sided stitching apparatus 110 is moving and the linear movement of the needle 115 can keep the needle 115 in a stationary position relative to the double-sided stitching apparatus 110 and relative to the composite workpiece 200 while the needle reciprocates from the double-sided stitching apparatus 110 to complete a stitch.

Figure 3:
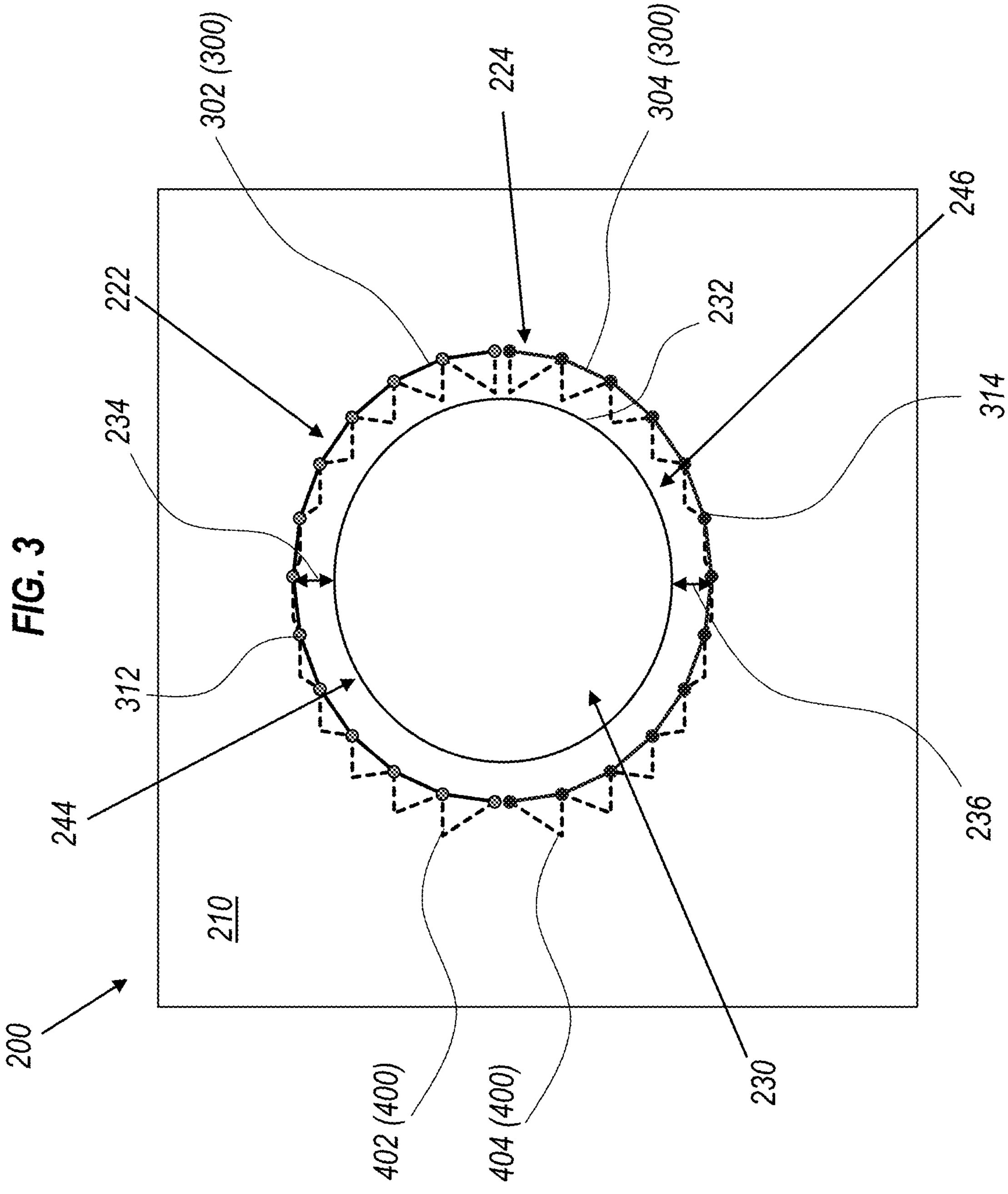
FIG. 3 is a schematic illustration of a workpiece having a hole therethrough.

As shown in FIG. 3, the filament 300 can include a first filament 302 stitched through the fabric 210 in a first pattern 222 and a second filament 304 stitched through the fabric 210 in a second pattern 224. The first pattern 222 can have a first shape which borders a first portion 244 of the perimeter 232, and the second pattern 224 can have a shape which borders a second portion 246 of the perimeter 232, and together the first pattern 222 and the second pattern 224 can follow greater than or equal to about 70%, or greater than or equal to about 80%, or greater than or equal to about 85%, or greater than or equal to about 90%, or greater than or equal to about 95% of a length of the perimeter 232. In an implementation, the first pattern 222 and the second pattern 224 can overlap and/or touch so that the perimeter 232 is entirely bordered by filament 300 stitched through the fabric 210.

The first shape of the first pattern 222 and the second shape of the second pattern 224 can be mirror images of one another (e.g., can by symmetric about an axis extending between the first pattern 222 and the second pattern 224).

The filament 300 can be stitched through the fabric 210 in any stitch style. For example, the filament 300 can be stitched through the fabric 210 with a chain stitch, backstitch, overcast stitch, cross stitch, and the like).

The filament 300 can be stitched through the fabric 210 with a chain stitch pattern which can have a series of interlocking loops of the filament 300 on a bottom surface of the fabric 210 and a corresponding series of stitches on a top surface of the fabric (e.g., extending between stitch penetration points 312 of the first pattern 222 and/or stitch penetration points 314 of the second pattern 224).

Figure 4:
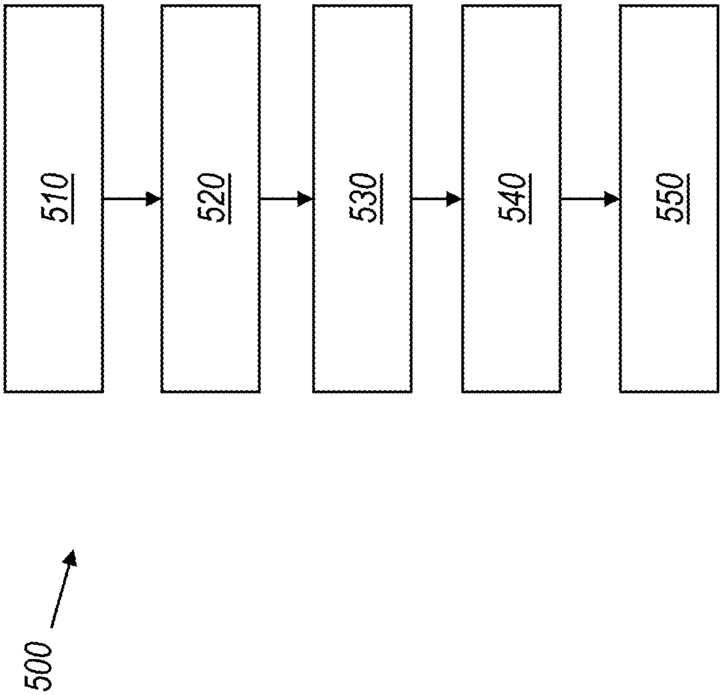
FIG. 4 is a schematic illustration of a method of the disclosure.

As shown in FIG. 4, a method 500 can include a first step 510 including stitching the filament 300 through a fabric 210 (e.g., a fiber composite preform) in a curved shape offset away from the perimeter 232 of an opening 230 to be formed in the fabric 210 by less than or equal to about one-half of an inch, or less than or equal to about one-quarter of an inch, or less than or equal to about one-eighth of an inch. The curved shape can correspond to a perimeter 232 of an opening 230 that is to be formed in the fabric 210 once the fabric is consolidated into a fiber composite (e.g., after the fiber composite preform is infused and encapsulated with a bulk material, such as a resin in the case of a resin-fiber composite part, to form a finished fiber composite part). The first step 510 can form a stitched fiber composite preform ready for consolidation with a bulk material.

The method 500 can further include a second step 520 including vacuum consolidating the fiber composite preform with a bulk material to form a composite part, and a third step 530 including removing a portion of the composite part to form the opening 230 through the composite part.

The third step 530 can include at least one of cutting, drilling, machining, or milling through the composite part to form an opening 230 (e.g., a hole through the composite part).

The method 500 can further include a fourth step 540 including extending a stud of a two-part fastener through the opening 230 (e.g., through a hole formed through the composite part). The stud can include a lug, a pin, a bolt, or the like configured to extend through an opening of the composite part and couple to a corresponding head of the two-part fastener. The stud can include a through-hole, a threaded surface, an indentation, or other mechanical features configured to receive and couple to the head. The method 500 can further include a fifth step 550 including coupling, to the stud, a head of the two-part fastener which corresponds to the stud to secure the two-part fastener in the opening 230. The head can include a nut, pin, ring, or the like configured to couple to the stud and fasten the composite part to the two-part fastener. The head can include a threaded surface, a protrusion, or other mechanical features configured to be received by and couple to the stud.

Figure 5:
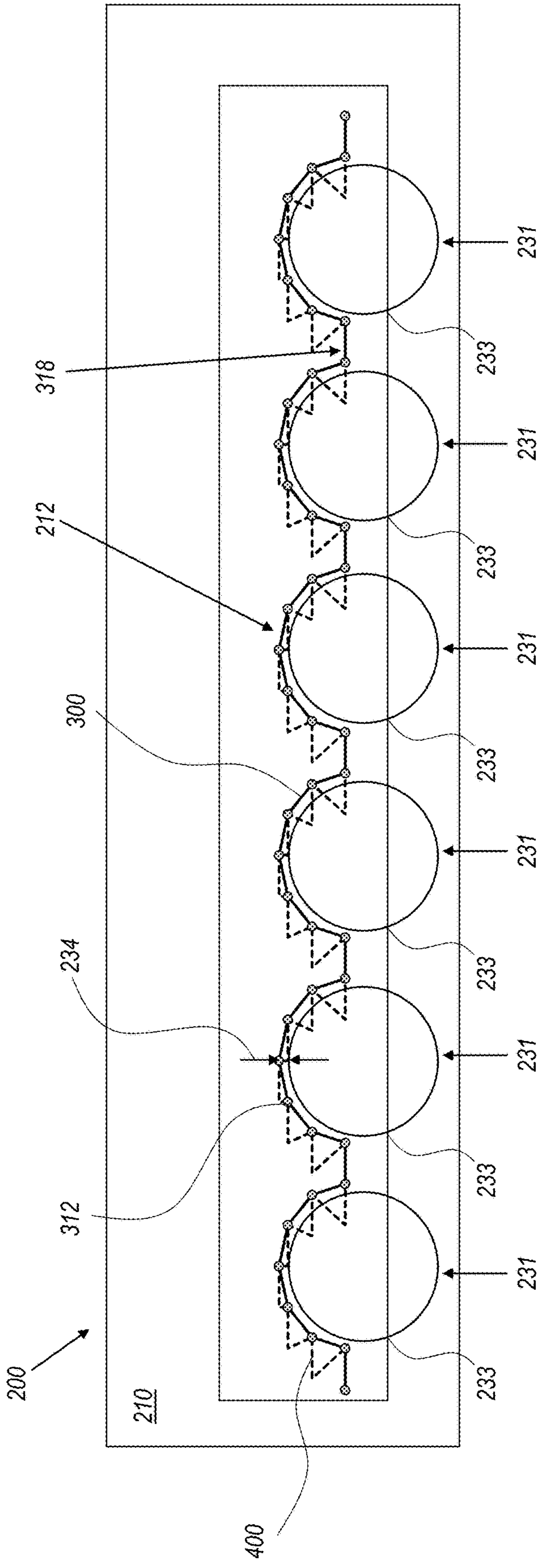
FIG. 5 is a schematic illustration of a workpiece having multiple openings therethrough.

As shown in FIG. 5, the filament 300 can be stitched into the fabric 210 in a repetitive pattern, such as a series of partial circles. The repetitive pattern of the filament 300 can be configured to border a series of openings 231 (e.g., having perimeters 233) which are to be formed in the composite part following a consolidation process. One or more linking stitches 318 can be used between the curved shapes of the repetitive pattern. Upon consolidation and removal of material from the composite workpiece 200 to form the series of openings 231, the filament 300 can strengthen at least the perimeters 233 of the series of openings 231. Such a structure can be useful for composite parts that will be attached to other structures with by a series of fasteners extending through the series of openings. The distance 234 can be uniform throughout the composite workpiece 200 or can change as a function of position relative to the opening 230.

Figure 6B:
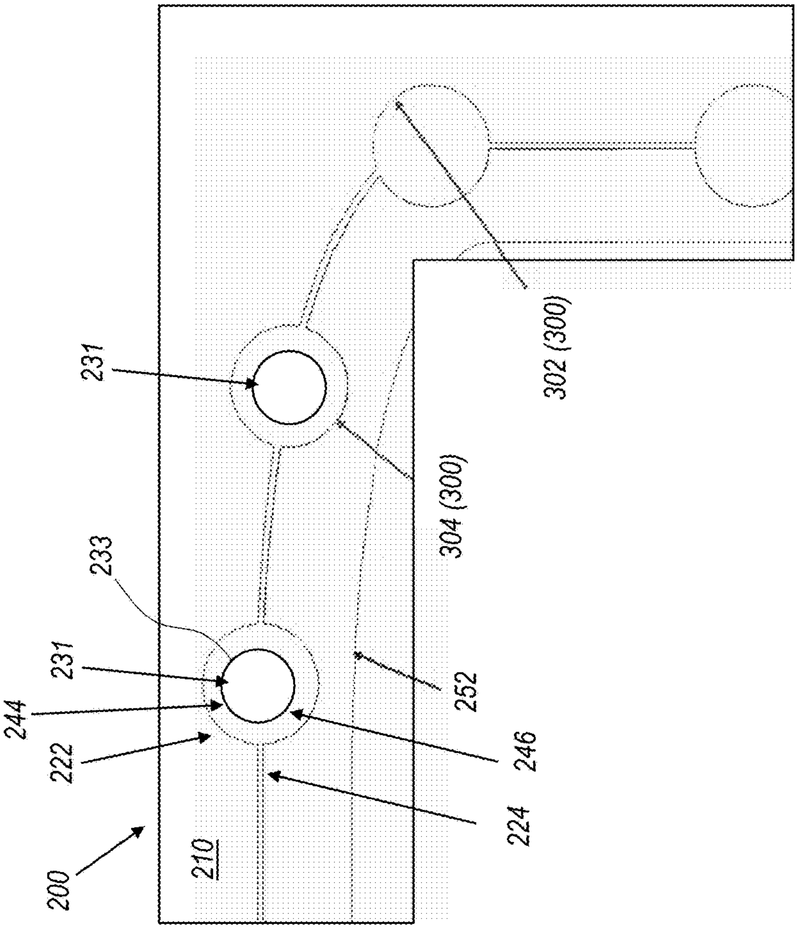
FIG. 6B is a schematic illustration of the portion 600 of FIG. 6A.
Figure 6A:
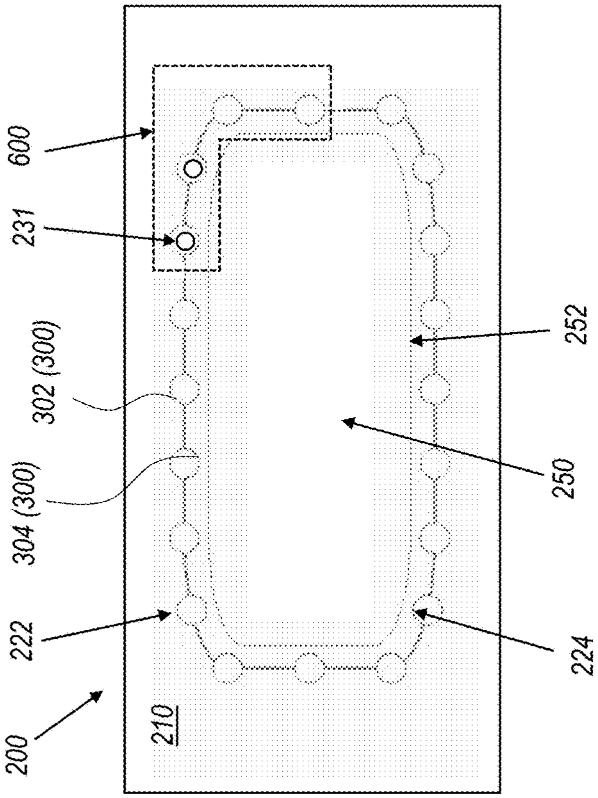
FIG. 6A is a schematic illustration of a workpiece having multiple openings therethrough surrounding an access opening.

As shown in FIGS. 6A and 6B (which is a detail of portion 600 of FIG. 6A), the first filament 302 can be stitched through the fabric 210 in a first pattern 222 and the second filament 304 can be stitched through the fabric 210 in a second pattern 224. The first pattern 222 can have a first shape which borders a first portion 244 of the perimeters 233 of a series of openings 231, and the second pattern 224 can have a shape which borders a second portion 246 of the perimeters 233 of the series of openings 231, and together the first pattern 222 and the second pattern 224 can follow greater than or equal to about 70%, or greater than or equal to about 80%, or greater than or equal to about 85%, or greater than or equal to about 90%, or greater than or equal to about 95% of a length of the perimeters 233 of the series of openings 231. In an implementation, the first pattern 222 and the second pattern 224 do not overlap and/or touch so that the perimeters 233 are not entirely bordered by filament 300 stitched through the fabric 210.

The first shape of the first pattern 222 and the second shape of the second pattern 224 can correspond to one another so that together the first shape of the first pattern and the second shape of the second pattern together encircle an opening 250 through the composite workpiece 200. For example, the opening 250 can be an access port which is surrounded by the series of openings 231 (e.g., bolt holes) where fasteners (e.g., bolt studs) will be extended through the composite workpiece 200 when in service. The opening 250 can include a perimeter 252 which is adjacent to the stitched patterns which can act to prevent and/or reduce damage from stress, vibration, and mechanical impacts when in service (e.g., from use of the access port) as previously described.

Figure 7:
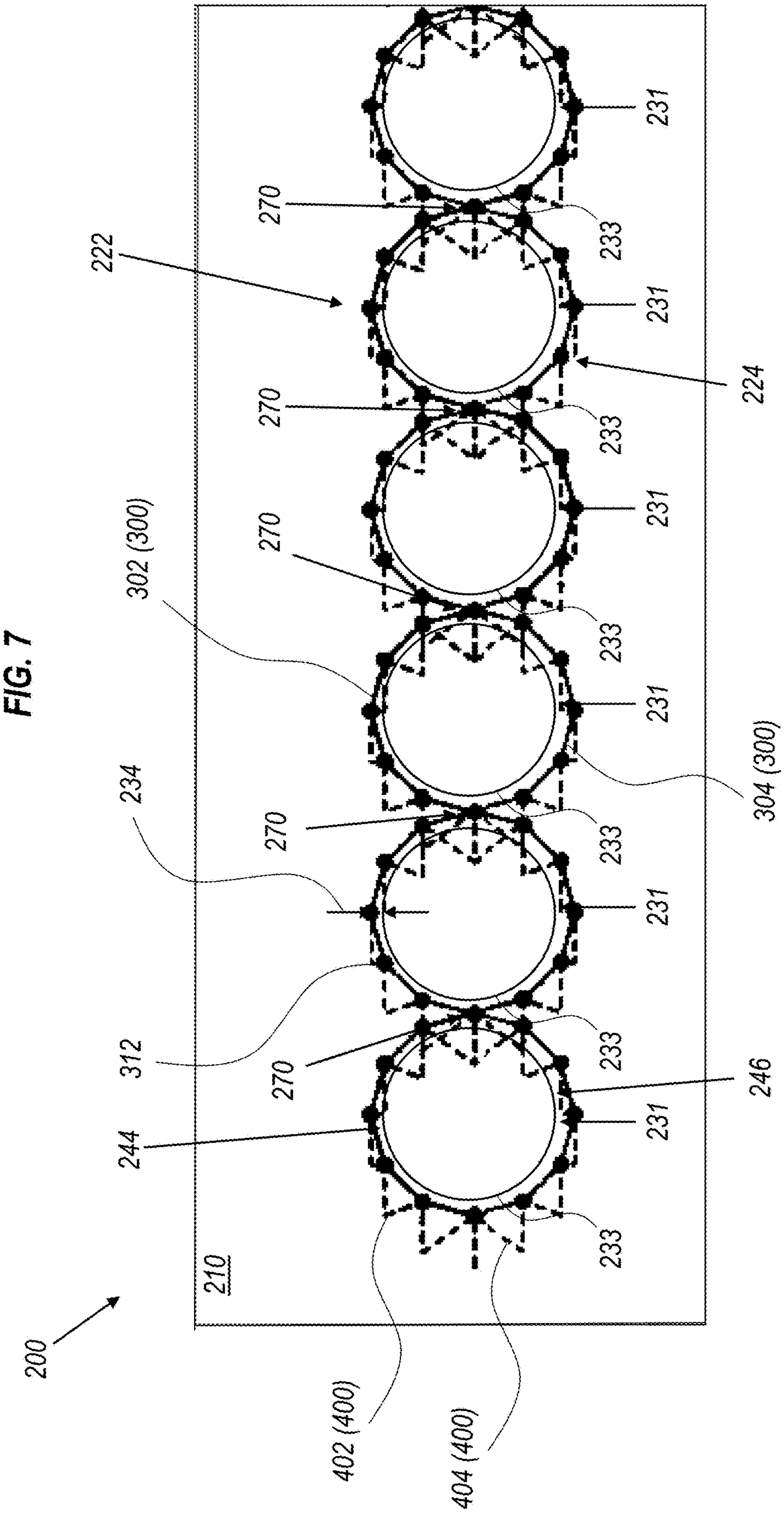
FIG. 7 is a schematic illustration of a workpiece having multiple openings therethrough bordered by overlapping stitched filaments.

As shown in FIG. 7, the filament 300 can include the first filament 302 stitched through the fabric 210 in the first pattern 222 and the second filament 304 stitched through the fabric 210 in the second pattern 224. The first pattern 222 can have a first shape which borders a first portion 244 of the perimeters 233 of the series of openings 231, and the second pattern 224 can have a shape which borders a second portion 246 of the perimeters 233 of the series of openings 231, and together the first pattern 222 and the second pattern 224 can follow greater than or equal to about 70%, or greater than or equal to about 80%, or greater than or equal to about 85%, or greater than or equal to about 90%, or greater than or equal to about 95% of a length of the perimeter 232.

Here, the first pattern 222 and the second pattern 224 can overlap and/or touch at least at a series of cross-over points 270 so that the perimeter 232 of each opening of the series of openings 231 is entirely bordered by filament 300 stitched through the fabric 210. As a result, the filament 300 can encapsulate (e.g., surround) fasteners extended through the series of openings 231. Furthermore, here, the plurality of connected path segments 400 along which the double-sided stitching apparatus 110 moves during stitching includes a first plurality of connected path segments 402 (e.g., shown in dotted lines) followed by the double-sided stitching apparatus 110 to stitch the first filament 302 in the first pattern (e.g., a sinusoidal pattern) and a second plurality of connected path segments 404 (e.g., shown in dotted lines) followed by the double-sided stitching apparatus 110 to stitch the second filament 304 in the second pattern (e.g., a cosine pattern corresponding to the sinusoidal pattern of the first filament 302). In this way, the first shape of the first pattern 222 and the second shape of the second pattern 224 can be mirror images of one another (e.g., can by symmetric about an axis extending between the first pattern 222 and the second pattern 224). Similarly, the first plurality of connected path segments 402 and the second plurality of connected path segments 404 can be mirror images of one another (e.g., can by symmetric about an axis extending between the first plurality of connected path segments 402 and the second plurality of connected path segments 404). The distance 234 can be consistent throughout the patterns so that the series of openings 231 have filament 300 disposed at a consistent offset from the perimeters 233 throughout the composite workpiece 200.

Figure 8:
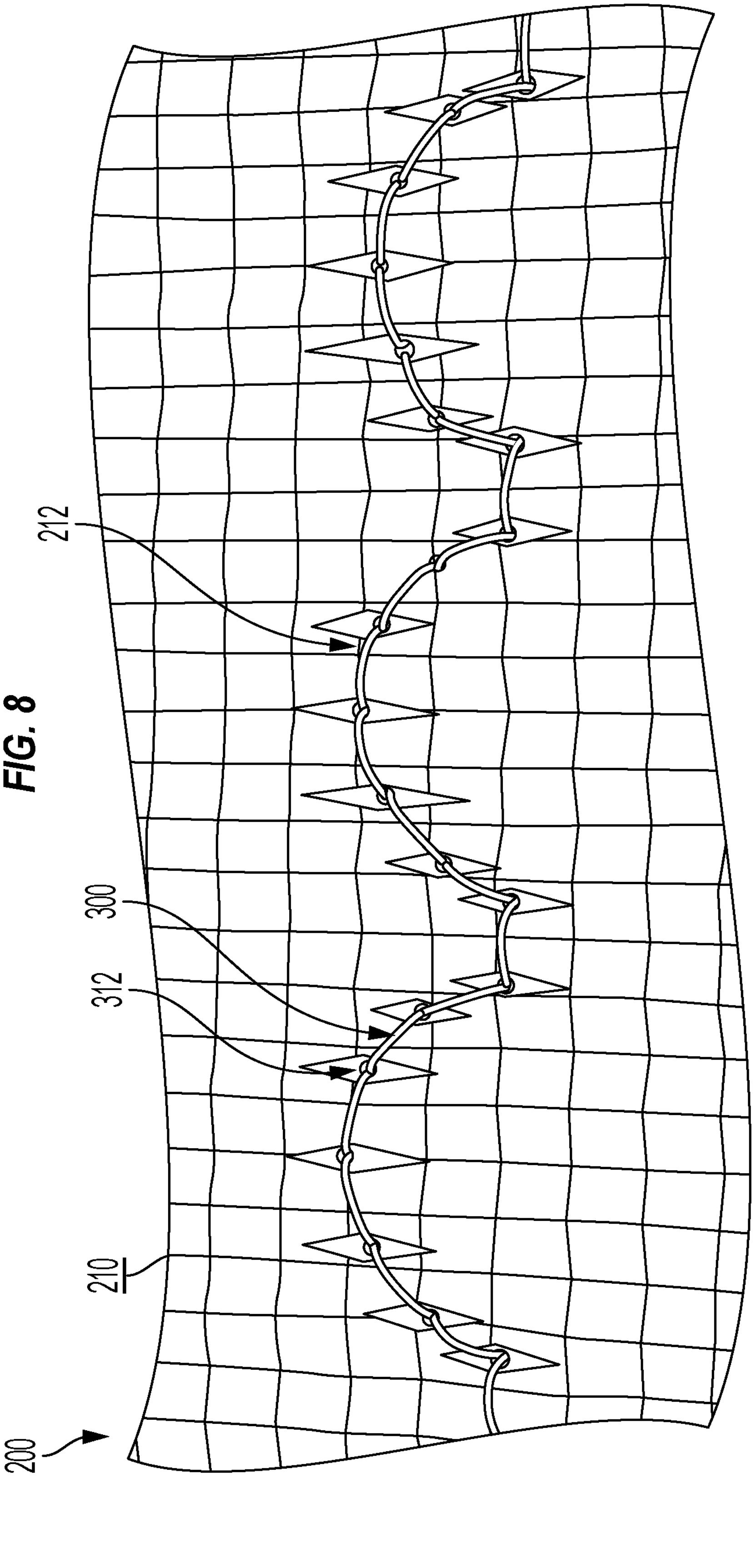
FIG. 8 is a gray-scale photograph of a workpiece manufactured with the apparatus and according to the methods of the disclosure.

As shown in FIG. 8, the fabric 210 of the composite workpiece 200 can include a plurality of unidirectional, uncrimped fibers bundled together with crossing threads to hold the bundles in place. The fabric can include any reinforcing fiber, e.g., including nylon 66, polyester, liquid-crystal polymer, aramid, polyvinyl-alcohol, polyethylene, carbon, and glass and the like. The filament 300 can include any reinforcing fiber, e.g., including nylon 66, polyester, liquid-crystal polymer, aramid, polyvinyl-alcohol, polyethylene, carbon, and glass. The filament 300 can be seen penetrating the fabric 210 at stitch penetration points 312 in equal intervals to form the stitch pattern 212 having a curved shape.

As used herein, each of the phrases such as "A or B," "at least one of A and B," "at least one of A or B," "A, B or C,", A, B, and C", "at least one of A, B, and C," and "at least one of A, B, or C" may include any one of the listed items, or all possible combinations thereof. For example, use of "at least one of" preceding a group of items should be interpreted in a disjunctive way with respect to the group of items, e.g., so that presence of one item of the group meets the meaning of the recitation.

As used herein, the words "a," "an" and "the" are intended to include plural forms of elements unless specifically referenced as a single element.

As used herein, the term "and/or" includes a combination of a plurality of related listed components, or any component among the plurality of related listed components.

As used herein, terms such as "first," "second," or "first" or "second" may be used simply to distinguish one component from other components, and do not limit the components in other aspects (e.g., importance or order).

As used herein, the terms "comprise(ing)", "include(ing)" or "have(ing)" are intended to indicate the presence of a characteristic, number, step, operation, process, component, part, feature, function, and/or element, or any combination thereof described in the present document, and the possibility of the presence or addition of one or more other characteristics, numbers, steps, operations, processes, components, parts, features, functions, and/or elements, or any combination thereof is not precluded.

As used herein, when a component is "connected," "coupled," "supported," or "in contact" with another component, this includes not only cases in which components are directly connected, coupled, supported, or in contact with each other, but also cases in which they are indirectly connected, coupled, supported, or in contact through a third component.

As used herein, when a component is disposed "on" another component, this includes not only a case in which the component is in contact with another component, but also a case in which still another member is present between the two components.

As used herein, a term, such as "about" or "substantially," is used at a corresponding numerical value or used as a meaning close to the numerical value when e.g., manufacturing and material tolerances which may be inherent in the stated meaning are presented. In particular, as used herein, the terms "about" and "approximately" refer to values that are plus or minus ten percent of the base value. That is, for example, reference to "about 100" or "approximately 100" refers to "90-110" inclusive. In some implementations, "about" may refer to plus or minus five percent of the base value, or plus or minus two percent of the base value.

What is claimed is:

1. A composite part configured for an application comprising:

a fabric having a plurality of stacked fiber layers;

a filament stitched through the plurality of stacked fiber layers of the fabric in a pattern; and a bulk material consolidated with the fabric and the filament, wherein the fabric and the bulk material are configured to include an opening through the composite part, the opening having a perimeter, and the pattern has a shape which borders the perimeter and is offset away from the perimeter by less than or equal to about one-half of an inch; and a two-part fastener that includes a stud which extends through the opening and a head that corresponds to the stud to secure the two-part fastener within the opening during service of the composite part in the application.

2. The composite part of claim 1, wherein the filament is offset away from the perimeter by less than or equal to about one-quarter of an inch.

3. The composite part of claim 1, wherein the filament is offset away from the perimeter by less than or equal to about one-eighth of an inch.

4. The composite part of claim 1, wherein the opening has a circular shape.

5. The composite part of claim 4, wherein the filament encircles the perimeter of the circular shape and is offset away from the perimeter by less than or equal to about one-quarter inch.

6. The composite part of claim 1, wherein the filament includes a first filament stitched through the fabric in a first pattern and a second filament stitched through the fabric in a second pattern, the first pattern has a first shape which borders a first portion of the perimeter, and the second pattern has a second shape which borders a second portion of the perimeter, and together the first pattern and the second pattern follow at least about 80% of a length of the perimeter.

7. The composite part of claim 1, wherein the filament is stitched through the fabric with a chain stitch pattern haying a series of interlocking loops of the filament on a bottom surface of the fabric and a corresponding series of stitches on a top surface of the fabric.

8. The composite part of claim 1, wherein the opening forms a hole through the composite part.

9. The composite part of claim 1, wherein the stud is a pin, a lug, or a bolt, and the head is a pin, a nut, or a ring.

10. A composite comprising:

a fabric having a plurality of stacked fiber layers;

a filament stitched through the fabric in a pattern; and a bulk material surrounding the fabric and the filament, wherein the fabric and the bulk material are configured to include an opening through the composite, the opening having a perimeter, the pattern has a shape which borders the perimeter and is offset away from the perimeter by less than or equal to about one-half of an inch, the fabric has a surface and the pattern includes a plurality of adjacent points where the filament is stitched through the fabric and extends along the fabric surface between adjacent points of the plurality of adjacent points, and the pattern shape along the plurality of adjacent points forms a curve, the pattern extends between adjacent points of the plurality of adjacent points to form two or more connected path segments between the adjacent points, and a ratio of a number of path segments of the plurality of connected path segments to a number of adjacent points of the plurality of adjacent points is 2:1 for at least a portion of the stitch pattern.

11. The composite of claim 10, wherein apart from a first point of the plurality of adjacent points, adjacent points of the plurality of adjacent points correspond to two connected path segments of the plurality of connected path segments.

12. The composite of claim 10, wherein each path segment of the plurality of connected path segments is linear.

13. A composite part configured for an application comprising:

a fabric having a plurality of stacked fiber layers;

a filament stitched through the fabric in a pattern, the filament reinforcing a through- thickness of the composite part;

a bulk material surrounding the fabric and the filament, the fabric and the bulk material are having an opening through the composite part, the opening having a curved perimeter; and a fastener extending through the opening, the filament providing reinforcement where the fastener interacts with the composite part during service of the composite part in the application;

wherein the pattern has a curved shape which borders at least a portion of the perimeter and is offset away from the perimeter by less than or equal to about one-half of an inch.

14. The composite part of claim 13, wherein the filament is offset away from the perimeter by less than or equal to about one-eighth of an inch.

15. The composite part of claim 13, wherein the filament includes a first filament stitched through the fabric in a first pattern and a second filament stitched through the fabric in a second pattern, the first pattern has a first shape which borders a first portion of the perimeter, and the second pattern has a second shape which borders a. second portion of the perimeter, and together the first pattern and the second pattern follow at least about 80% of a length of the perimeter.

16. The composite part of claim 13, wherein the filament is stitched through the fabric with a chain stitch pattern having a series of interlocking loops of the filament on a bottom surface of the fabric and. a corresponding series of stitches on a top surface of the fabric.

17. The composite part of claim 13, wherein the fabric has a surface and the pattern includes a plurality of adjacent points where the filament is stitched through the fabric and extends along the fabric surface between adjacent points of the plurality of adjacent points to form two or more connected path segments between the adjacent points; and the pattern shape along the plurality of adjacent points forms a curve.

18. The composite part of claim 1, wherein the application is an aerospace industry application.

19. The composite part of claim 13, wherein the application is an aerospace industry application.

* * * * *